United States Patent
Ali-Ahmad et al.

(10) Patent No.: US 8,925,093 B2
(45) Date of Patent: *Dec. 30, 2014

(54) SYSTEM AND METHOD FOR PERFORMING REMOTE SECURITY ASSESSMENT OF FIREWALLED COMPUTER

(75) Inventors: Wissam Ali-Ahmad, Cupertino, CA (US); Wolfgang Kandek, San Jose, CA (US); Holger Kruse, Redwood Shores, CA (US); Vikas Dewan, Redwood Shores, CA (US); Khair-ed-dine Mazboudi, San Jose, CA (US); Ganesh Jampani, Gilroy, CA (US); Kenneth K. Okumura, Sunnyvale, CA (US)

(73) Assignee: Qualys, Inc., Redwood Shores, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/482,531

(22) Filed: May 29, 2012

(65) Prior Publication Data

US 2012/0233700 A1    Sep. 13, 2012

Related U.S. Application Data

(63) Continuation of application No. 12/541,869, filed on Aug. 14, 2009.

(60) Provisional application No. 61/089,381, filed on Aug. 15, 2008.

(51) Int. Cl.
  *G06F 21/50* (2013.01)
  *G06F 21/60* (2013.01)
  *H04L 29/06* (2006.01)

(52) U.S. Cl.
  CPC .... *H04L 63/1408* (2013.01); *G06F 2221/2119* (2013.01); *H04L 63/166* (2013.01); *G06F 2221/2101* (2013.01); *H04L 63/1441* (2013.01)

USPC .......................................................... 726/25

(58) Field of Classification Search
  CPC ...... G06F 21/50; G06F 21/60; H04L 63/1408
  USPC .......................................................... 726/25
  See application file for complete search history.

(56) References Cited

U.S. PATENT DOCUMENTS

| 2005/0182937 | A1  | 8/2005 | Bedi |
| 2006/0174115 | A1* | 8/2006 | Rao et al. ...................... 713/168 |
| 2007/0030539 | A1* | 2/2007 | Nath et al. .................... 358/520 |
| 2008/0064383 | A1* | 3/2008 | Nath et al. .................... 455/418 |
| 2008/0072311 | A1* | 3/2008 | Mullick et al. ................. 726/15 |

OTHER PUBLICATIONS

PCT/US2009/053942, International Search Report and Written Opinion of the International Searching Authority mailed Oct. 22, 2009.

* cited by examiner

*Primary Examiner* — William Powers
(74) *Attorney, Agent, or Firm* — Baker & McKenzie LLP

(57) ABSTRACT

Methods and systems for scanning an endpoint terminal across an open computer network are disclosed. An exemplary method includes providing a scanner engine in a computer server in communication with an open computer network, and establishing a secure connection across the open computer network between the scanner engine and a scanner agent installed on the endpoint terminal in communication with the open computer network. Commands for collecting data regarding the endpoint terminal are sent from the scanner engine across the secure connection to the scanner agent. The scanner engine then receives the collected data from the scanner agent across the secure connection, analyzes the data to assess a current posture of the endpoint terminal, and determines any updates for the endpoint terminal from the analysis. Updates are sent across the secure connection to the scanner agent for installation on the endpoint terminal, and the secure connection may then be terminated.

32 Claims, 6 Drawing Sheets

SYSTEM AND METHOD FOR PERFORMING REMOTE SECURITY ASSESSMENT OF FIREWALLED COMPUTER

CROSS-REFERENCE TO RELATED APPLICATION

The present application is a continuation application of U.S. patent application Ser. No. 12/541,869 filed Aug. 14, 2009 entitled "System and method for performing remote security assessment of firewalled computer," which application claims the benefit of U.S. Provisional Application No. 61/089,381 filed Aug. 15, 2008, both of which are incorporated herein by reference in their entirety as set forth in full.

TECHNICAL FIELD

Disclosed embodiments herein relate generally to the computer security, and more particularly to systems and methods for remotely scanning a firewalled computer using a conduit to agent software.

BACKGROUND

Computer networks offer users ease and efficiency in exchanging information. Computer networks are typically comprised of integrated servers, routers, terminals and other components, interoperating and sharing information. Such networks manage a growing list of a variety of needs including transportation, commerce, energy management, communications, and defense.

Unfortunately, the very interoperability and sophisticated integration of technology that make computer networks such valuable assets also make them vulnerable to attack, and make dependence on networks a potential liability. Numerous examples of planned network attacks, such as viruses, worms, and spyware have shown how interconnectivity can be used to spread harmful program code. In addition, public or open network architectures, such as the Internet, permit hackers to have access to information on many different computers. These malicious attackers attempt to gain access to messages generated by a user's computer and to the resources of the user's computer, as well as to use knowledge regarding the operations of the protocol stack and operating systems of users' computers in an effort to gain access to their computers without authorization. Such illicit activity presents a significant security risk to any computer coupled to a network where a user for one computer may attempt to gain unauthorized access to resources on another computer of the network. Furthermore, organized groups have performed malicious and coordinated attacks against various large online targets.

When assessing the security posture of an endpoint device such as a computer terminal or workstation, scanning software is used to conduct tests for the existence of software components containing object code vulnerable to malicious attacks. For such security assessments, there are two methods for the runtime deployment of such scanning software. The first method is when the scanning software is deployed using a server in a client-server architecture. In this type of deployment, the scanning software conducts a network-based assessment of the target system, with minimum or no new software installed on the endpoint computer device. Such a technique may be known as remote scanning. The second method is when the scanning software is deployed locally on the target system. In this type of deployment, the entire scanning software is a "thick client" installed on the local device that contains the scanning engine. Such a technique may be known as local scanning.

There are advantages and disadvantages associated with both methods of scanning. The primary advantage of remote scanning is that it does not require additional software to be installed on the target local system. On the other hand, local scanning requires dedicated IT resources for managing the deployment and updates of client software on the endpoint devices. The coverage and accuracy of vulnerability detection using local scanning tends to be better than with remote scanning. Typically, in order to achieve the same level of effectiveness with remote scanning, a network-based scanner requires credentialed access via an open firewall rule on the end-point device. Accordingly, what is needed is a technique for scanning and detecting vulnerabilities on local computer devices having the effectiveness of local scanning engines installed on the local devices, but without the requirement of dedicating resources for deploying, managing and updating the client software for each computer to be scanned.

SUMMARY

Disclosed herein are methods and systems for scanning an endpoint terminal across an open computer network. By employing a system or method in accordance with the disclosed principles, at least two distinct advantages are achieved. Specifically, conducting a remote scan according to the disclosed principles eliminates the need for a remote scanner to have credentialed access through an open firewall port. In an open computer network, such as the Internet, endpoint client terminals typically employ firewalls to limit access to authorized persons or devices. A purely remote scanner engine must therefore have authorized access through such a firewall, whereas the approach of the disclosed principles eliminates such a requirement. In addition, conducting a remote scan according to the disclosed principles reduces the need for internal IT resources to manage the deployment and updates of thick client software on the endpoint. A purely local scanner engine requires installation, activation and updating at the local level, whereas the approach of the disclosed principles eliminates such a requirement as well.

In one embodiment, a method of conducting a scan on an endpoint terminal across an open computer network is disclosed. Such a method may comprise providing a scanner engine in a computer server in communication with an open computer network, and providing a scanner agent installed on an endpoint terminal in communication with the open computer network. In addition, such a method may comprise collecting data regarding the endpoint terminal using the scanner agent, and receiving the collected data from the scanner agent at the scanner engine. The scanner engine may then be used for analyzing the collected data with the scanner engine to assess a current posture of the endpoint terminal, and determining any updates for the endpoint terminal from the analysis. Moreover, such an exemplary method may include sending the updates to the scanner agent for installation on the endpoint terminal.

In another embodiment, a system for conducting a scan on an endpoint terminal across an open computer network. Such a system may comprise a computer server in communication with an open computer network, wherein the computer server comprises a scanner engine. Such a system may also comprise a scanner agent installed on an endpoint terminal in communication with the open computer network. In such exemplary embodiments, the scanner engine is configured to receive data regarding the endpoint terminal collected by the scanner agent. The scanner engine may also be configured to analyze the collected data to assess a current posture of the endpoint terminal, and determine any updates for the endpoint terminal from the analysis. Additionally, the scanner engine may further be configured to send the updates to the scanner agent for installation on the endpoint terminal.

DETAILED DESCRIPTION

The disclosed principles provide for a scanning engine deployed on a remote server, and a thin client software that acts as a conduit to the remote scanning engine, for conducting, for example, security scanning in an open network to assess the security posture of endpoint systems/terminals. Among exemplary embodiments, the disclosed principles provide for conducting security assessment of firewall protected device via a remote scanner in an open network (Internet) and a thin-client deployed on the target endpoint terminal or device. In addition, the disclosed principles may be employed to provide a system for managing the deployment, update and run-time of such a thin-client on the endpoint device, as a conduit for the endpoint security assessment, as well as a system for automating and managing the lifecycle (i.e., operation and output) of a network-based endpoint device security assessment or scan via a thin-client.

Figure 1:
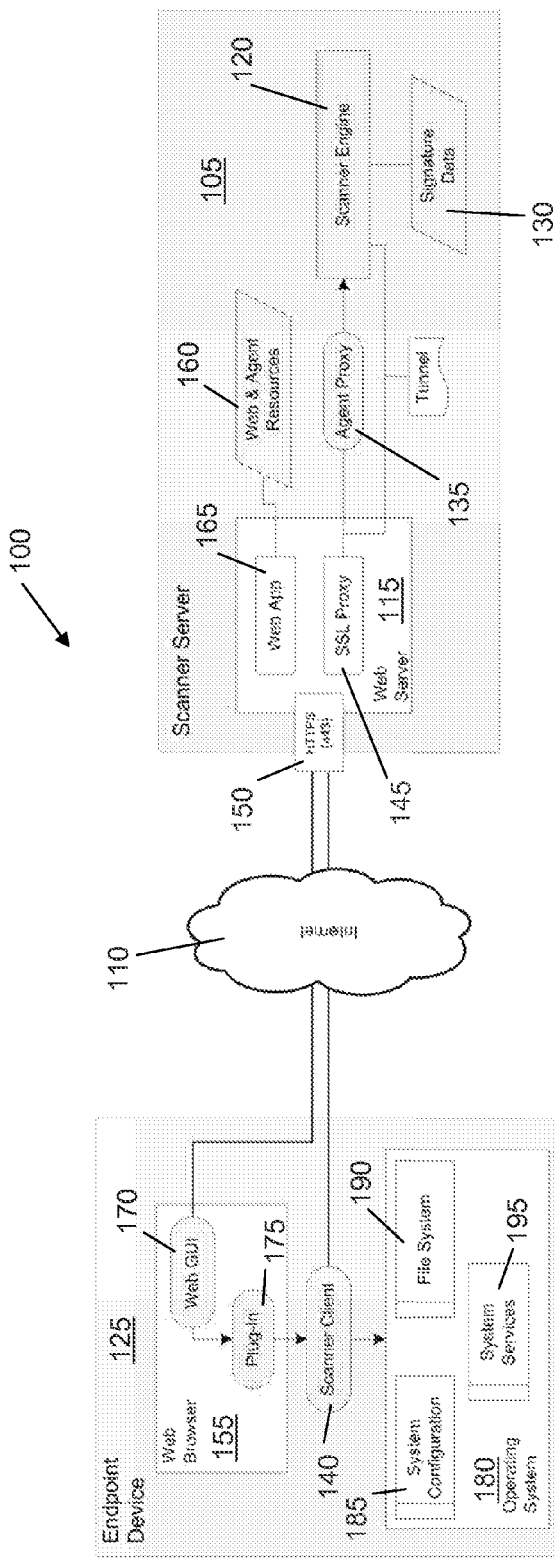
FIG. 1 illustrates a high level block diagram of one embodiment of a system constructed in accordance with the disclosed principles.

Looking initially at FIG. 1, illustrated is a high level block diagram of one embodiment of a system 100 constructed in accordance with the disclosed principles. In the illustrated embodiment, the system 100 includes a scanner server 105 coupled to an open computer network, such as the Internet 110. The system 100 also includes an exemplary target endpoint device 125 on which a scan is to be run in accordance with the disclosed principles. While a single endpoint device 125 is illustrated, the disclosed principles and techniques are of course expandable to multiple remote devices.

The scanner server 105 maybe be connected to the open network 110 via conventional communications means. For example, the scanner server 105 may include a web server 115 to provide the interface to the open network 110. The scanner server 105 may also include a scanner engine 120. The scanner engine 120 includes the scanning software (and/or hardware) used in conducting the specific scans of the target endpoint device(s) 125. For example, if the system 100 is to be employed to access and scan the security posture of the target endpoint device 125, the scanner engine 120 may include signature data 130 of viruses, worms, etc. for conducting such security assessments. Additionally, the scanner engine 120 may determine that certain patches may be needed on the endpoint device 125 to address vulnerability issues detected from the assessment based on the scan(s).

In order to implement a scan in accordance with the disclosed principles, an agent proxy 135 is included in the scanner server 105. The agent proxy 135 is used to initiate an agent-based scan at the endpoint device 125, and establishes the connection between the scanner engine 120 and the agent or thin-client installed on the target endpoint device 125 (i.e., scanner client 140, discussed below) via the web server 115. As a result, the remote scanner engine 120 causes the scanner client 140 to conduct a local scan of the endpoint device 125. The web server 115 includes a secure socket layer (SSL) proxy server 145, which establishes a secure HTTP-based connectivity 150 from the scanner client 140 and the agent proxy 135 to the scanner client 140. Other forms of secure connection across an open network 110 may also be employed with the techniques provided by the disclosed principles.

The web server 115 delivers the agent scanner client 140 artifacts (e.g., binary code) across the open network 110 to the endpoint device 125 via the web browser 155 running on the endpoint device 125. More specifically, the web and agent resources 160 are provided to the endpoint device 125 via a web application 165 on the web server 115. These resources 160 may be used to render the web-based graphical user interface (GUI) 170 via the browser 155 running on the endpoint device 125. Moreover, the web server 115 may run code for generating scan reports to an end-user of the endpoint device 125, based again on the agent resources 160. With the communications link provided by the web server 115 back to the agent proxy 135, the agent proxy 135 processes the scan results generated by the scanner engine 120. A 'tunnel' may also be provided in the scanner server 105 to act as a bi-directional communication channel between the scanner client 140 and the scanner engine 120.

Turning back to the client-side endpoint device 125, the web browser 155 may comprise a plug-in 175 that is used to establish the connection from the scanner client 140 back to the scanner engine 120, where the agent proxy 135 may process the results of the scan(s). In an exemplary embodiment, the scanner client 140 employs the QODA protocol exchange with the scanner engine 120 in order to conduct the desired scan(s), as well as to provide the results of such scan(s) back to the scanner engine 120. The QODA protocol is a TCP-based binary protocol which enables a connection between the scanner engine 120 and the scanner client 140, utilizing a flow control scheme. In other embodiments, similar protocols to QODA can be employed between the scanner client 140 and scanner engine 120.

During the scan(s), the scanner client 140 accesses the operating system 180 of the endpoint device 125. Once obtaining access, the scanner client 140 can then scan the security posture (or other appropriate scan, conducted in accordance with the implementation of the disclosed principles) of the endpoint device 125 by scanning the system configuration 185, file system 190 and system services 195 associated with the endpoint device 125. As mentioned above, results of the scan(s) may be communicated from the scanner client 140 back to the scanner server 105 for processing of the results. The browser-based plug-in 175 may then provide any needed downloads detected during the scan(s). In addition, the plug-in 175 may also provide automatic updates to the agent scanner client 140, as provided from the agent resources 160, in order to ensure the scanner client 140 is up-to-date on the latest signatures, etc. needed for conducting an appropriate scan of the endpoint device 125.

Figure 2:
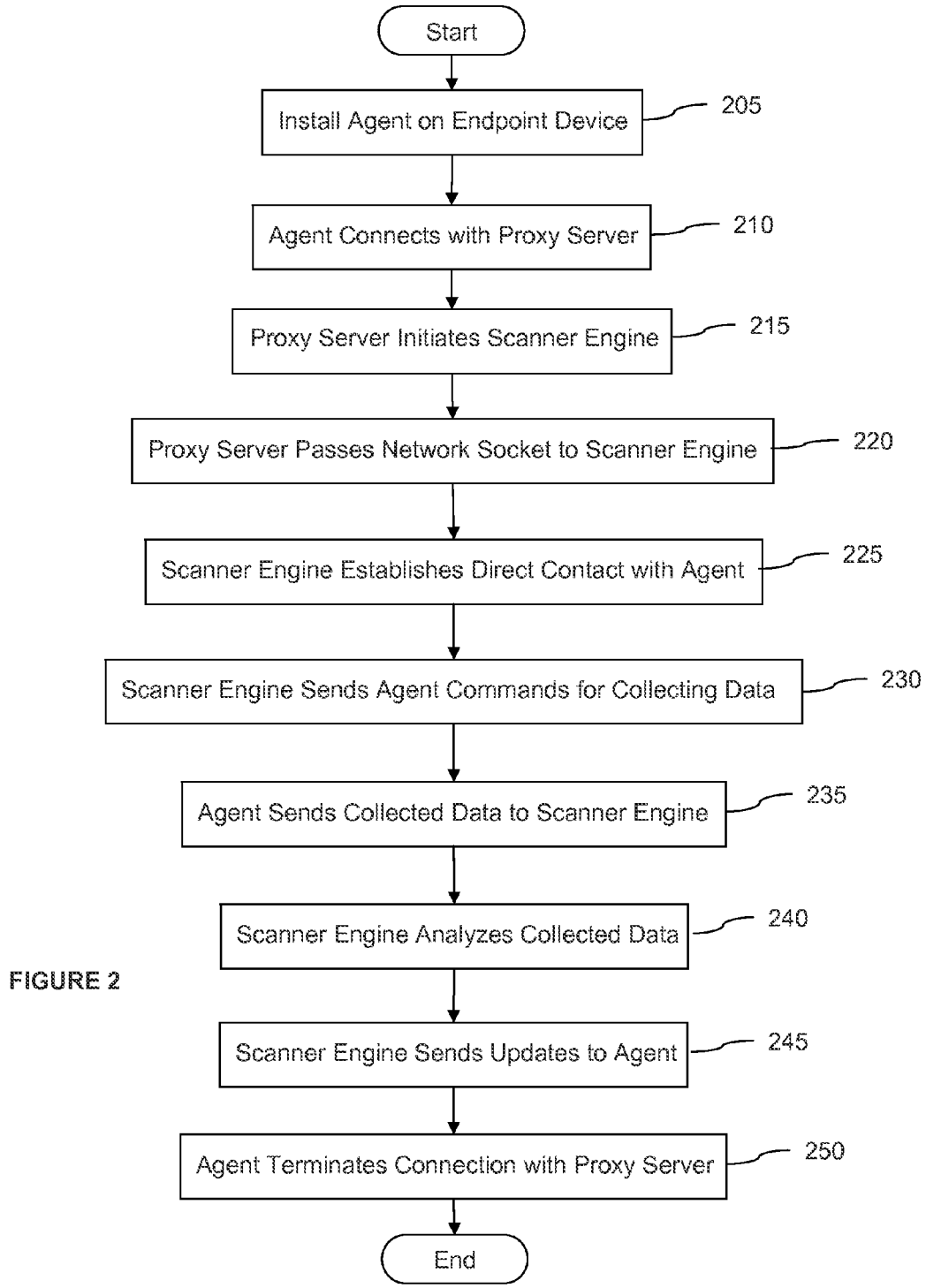
FIG. 2 illustrates a process flow diagram of an exemplary scan of an endpoint device conducted using the techniques of the disclosed principles.

FIG. 2 illustrates a process flow diagram 200 of an exemplary scan of an endpoint device 125 conducted using the techniques of the disclosed principles. The exemplary process is described with reference to components illustrated in FIG. 1. The process begins at a Start step where any appropriate system and/or device initialization for implementing the disclosed technique may take place.

At a step 205, the end-user is directed to install a "thin" client (Agent) 140 on their endpoint device 125. As discussed above, a "thin" client means software that acts as a conduit to a remote scanning engine, for conducting, for example, security scanning in an open network to assess the security posture of endpoint systems/terminals. This is contrasted from a "thick" client, which is embodied in software, etc. that conducts the scan locally, rather than from a location remote from endpoint device. In one implementation, the Agent 140 is deployed as a browser add-on or plug-in 175 (e.g., ActiveX for Internet Explorer). In such embodiments, the Agent 140 is non-memory resident after the browser 155 is closed. In another implementation, the Agent 140 can be installed as a permanent program on the endpoint device 125, perhaps even with self-update and self-scheduling capabilities.

After the Agent 140 is installed, at step 210 the Agent 140 starts the scanning process by connecting to a proxy server 145 (via secure network socket), and initiating a command to establish communication with the scanner engine 120. In turn, at step 215, the proxy server 145 initiates a process that launches the scanner engine 120 in Agent-based scanning mode. Specifically, the agent proxy 135 passes the handle to the open network socket to the scanner engine 120, as shown in step 220. Using the opened socket connection, the scanner engine 120 establishes direct communication with the client scanner software 140 (i.e., the Agent 140) on the endpoint device 125 at step 225.

In an exemplary embodiment, this communication may be in the QODA protocol, discussed above. During the protocol exchange, at step 230, the scanner engine 120 sends the Agent 140 commands for collecting data from specific operating system 180 configuration stores 185 (e.g., the Windows Registry), file system information 190, and system services stores 195. At step 235, upon completing all data collection, the Agent 140 transmits the collected data from the scan back to the scanner engine 120 via the proxy server 145 on the web server 115 and the agent proxy 135 through the opened socket connection.

At step 240, the scanner engine 120 then employs logic to analyze the collected data sent from the Agent 140. Based on its analyzing of the collected data, the scanner engine can determine the vulnerability of the endpoint device 125. Once the vulnerability determination is complete, at step 245 the scanner engine 120 sends any needed updates back through the agent proxy 135 and the proxy server 145 to the scanner client 140 on the endpoint device 125. Once any needed updates are sent to the Agent 140, at step 250 the scanner engine 120 terminates the communication with the Agent 140, and in turn, the Agent 140 terminates its connectivity with the proxy server 145 and marks the scan as done. The endpoint device 125 itself can then complete any additional steps needed to install the updates provided by the scanner engine 120. Although the above exemplary process has been described using the above steps, additional steps may also be included where needed to facilitate the scanning process in accordance with the disclosed principles.

In accordance with the exemplary embodiments described above, systems and processes for scanning in accordance with the disclosed principles differs substantially from current known practices and published systems and methods in several important respects. More specifically, the disclosed principles provide for an industry grade scanner engine to be deployed on a scanner server. Due to processing power and other considerations, installing and running scanning engines on the endpoint devices to be scanned can be severely limiting and taxing on the device. Deploying the scanner remotely in accordance with the disclosed principles saves local resources and requires no manual operation or management by users at the endpoint device level. Based on these concerns, the disclosed principles provide for a thin non-intrusive client to be installed on local client devices for conducting network-based scanning on those devices, even if they are firewalled. Thus, the end result can provide a web-based system for conducting and managing endpoint security assessments, integrated with the local agent-based scanner client.

Included below is an operational flow of one embodiment of a scan conducted in accordance with the disclosed principles:

Startup of the Agent Proxy Server (Independent of Agent Connections):
    Proxy Server opens UNIX domain datagram listening socket for the Scanner Engine to connect to.

When the Agent Becomes "Active" (e.g., Executed by User):
    Agent plug-in connects to the Proxy Server via SSL (port 443), and sends a startup HTTP request.
    Proxy Server responds to Agent plug-in and passes scan-related parameters back.
    Agent plug-in requests scan.

Scanning:
    Proxy Server launches the Scanner Engine, passing a reference to its local agent socket handler.
    In turn, the Scanner Engine connects back to the Proxy Server through domain socket, passes the reference back to the Proxy Server, allowing the Proxy Server to tie the connections.
    Once the scanning begins, the Scanner Engine is responsible for the connection to Agent plug-in. Accordingly, the Proxy Server will ignore the connection until the scan is over.
    Scanner Engine sends startup message to Agent plug-in, indicating protocol version.
    Agent plug-in tries to open Agent DLL on local hard disk and reads version (if Agent exists).
    Agent plug-in sends startup message to Scanner Engine: protocol version, OS version and Agent DLL version (if it exists).
    Scanner Engine compares versions and confirms version to Agent plug-in or uploads Agent DLL to Agent plug-in.
    In case of upload: Agent plug-in checks signatures on Agent DLL and saves it to disk.
    Agent plug-in loads Agent DLL from disk, and calls it.
    Agent DLL sends startup message to Scanner Engine.
    Scanner Engine responds to the message and starts a scan. (e.g., switch to QODA binary protocol)
    As the scan is running, the Scanner Engine uses Agent DLL to broker connection requests. A binary protocol is typically used between Scanner Engine and Agent DLL, however, other available protocols may also be employed if desired.

After Scanning:
    Scanner Engine sends "scan finished" message to Agent DLL.
    Agent DLL responds, switching back to HTTP protocol.
    Agent DLL returns control to Agent plug-in.
    Agent plug-in sends confirmation message to Scanner Engine.

Scanner Engine waits for confirmation message, closes the handler and exits.

After the scan is concluded, the Proxy Server detects that the Scanner Engine has finished the scan and thus that is again responsible for the connection to Agent plug-in.

Proxy Server performs necessary cleanup and generates the scan results

Agent plug-in closes the connection and returns an exit code back to the webpage. The webpage renders the scan report based on the generated scan results.

In addition, during a scan if some problem occurs, the Proxy Server could take over the connection immediately. The binary protocol could be designed in such a way that Agent DLL can detect that it is no longer in communication with the Scanner Engine, and is instead in communication with the Proxy Server. If such a situation occurs, a switch can be made back to Agent plug-in.

Figure 3:
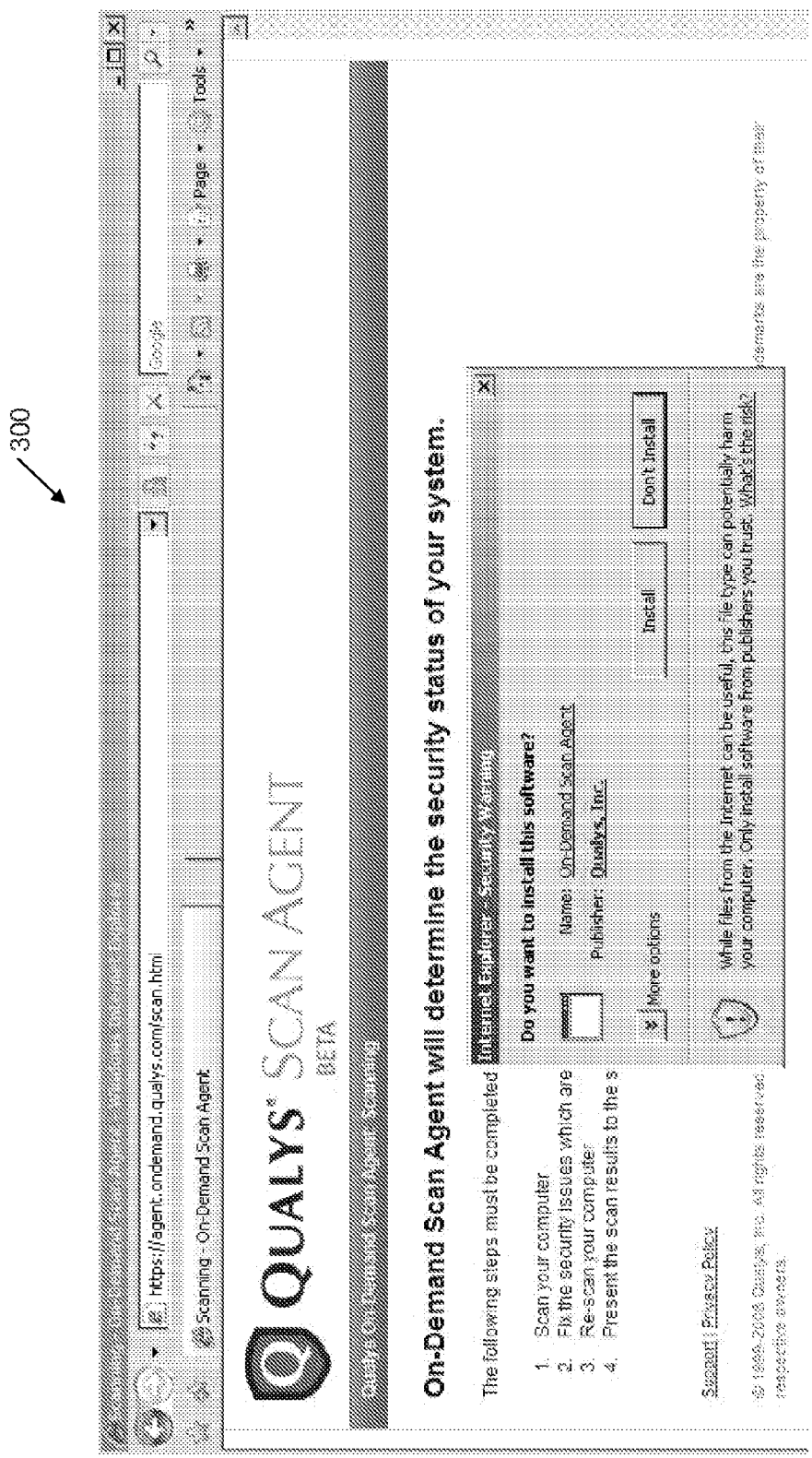
FIG. 3 illustrates a screen shot having a prompt for a user of an endpoint device to allow installation of the agent scanner client.

FIG. 3 illustrates a screen shot 300 having a prompt for a user of an endpoint device 125 to allow installation of the agent scanner client 140. Alternatively, the scanner client 140 may be installed and run on the endpoint device 125 without the end-user's knowledge.

Figure 4:
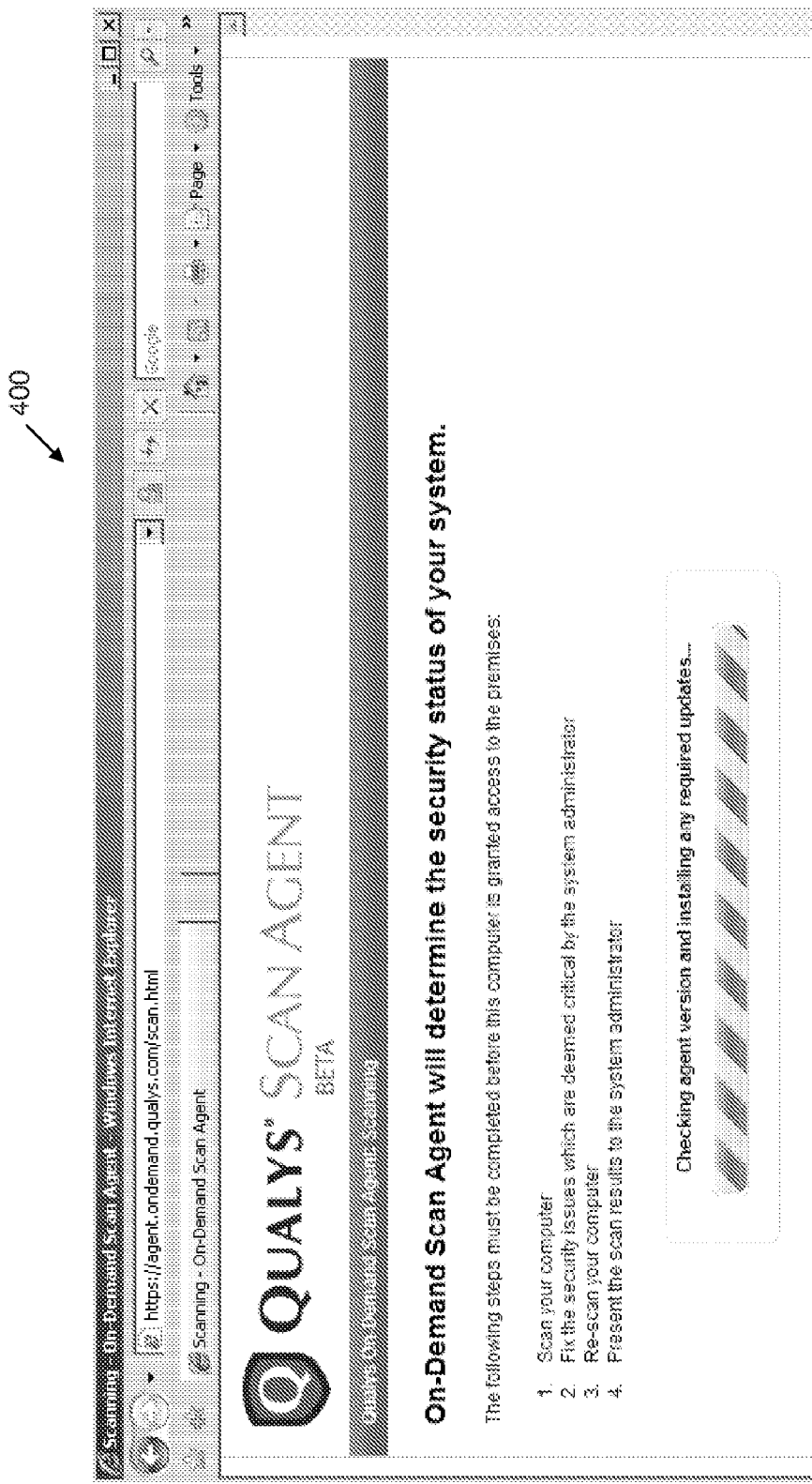
FIG. 4 illustrates a screen shot of the local agent scanner client conducting a scan on the endpoint device to determine whether the scanner client itself is fully updated.

FIG. 4 illustrates a screen shot 400 of the local agent scanner client 140 conducting a scan on the endpoint device 125 to determine whether the scanner client 140 itself is fully updated. If any updates to the local scanner client 140 are needed, those updates are downloaded from the remote scanner server 105, using the appropriate resources 160.

Figure 5:
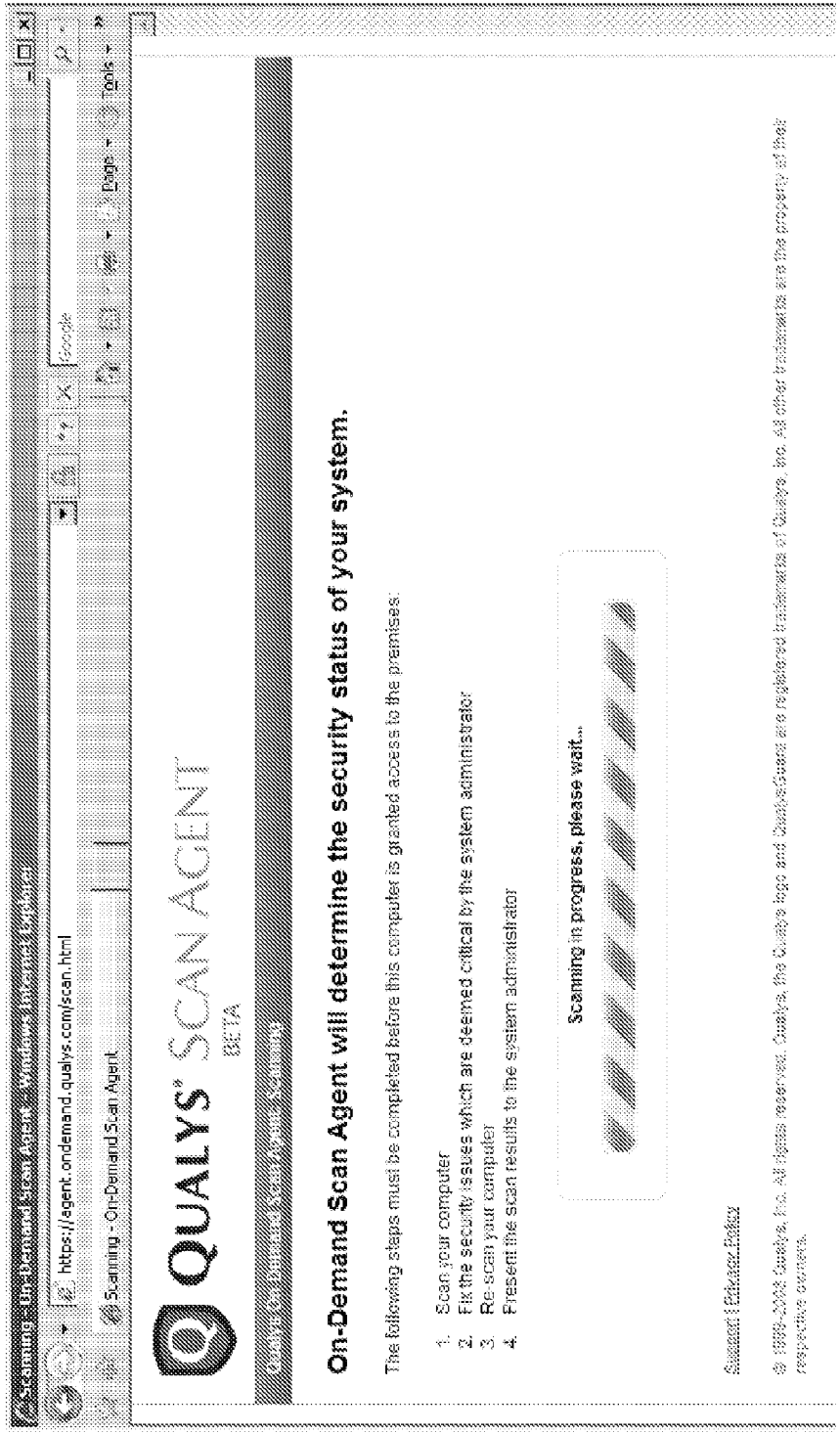
FIG. 5 illustrates a screen shot of the local agent scanner client conducting a scan on the endpoint device.

FIG. 5 illustrates a screen shot 500 of the local agent scanner client 140 conducting a scan on the endpoint device 125. As shown, the scan is run locally by the agent scanner client 140, and initiated and displayed via the web browser 155 on the endpoint device.

Figure 6:
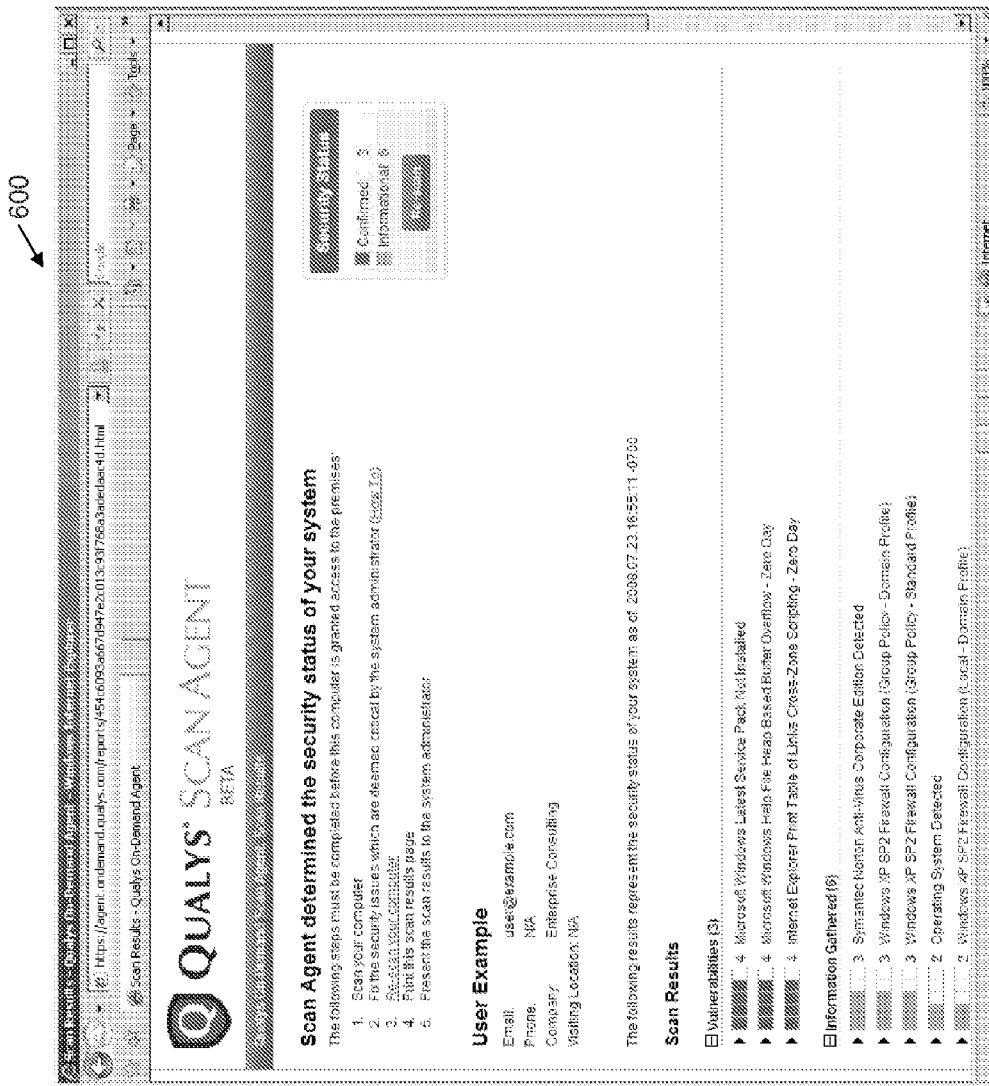
FIG. 6 illustrates a screen shot of exemplary results determined by the remote scanner engine and agent proxy from the scan of FIG. 4, and delivered to the endpoint device user via the local web browser.

FIG. 6 illustrates a screen shot 600 of exemplary scan results determined by the remote scanner engine 120 and agent proxy 135 from the scan of FIG. 4. The assessment of the scan results are delivered to the endpoint device and displayed to the user via the web browser 155 on the endpoint device. Update/download options may also be provided to the user via the web browser 155. Additionally, some updates to the endpoint device 125 may be provided automatically, based on the assessment, without requiring end-user acceptance of the updates. As also illustrated, re-scanning may be provided (or may be mandatory) in accordance with the techniques disclosed herein to ensure the endpoint device 125 has been fully updated, etc.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of conducting a scan on an endpoint system across an open computer network, the endpoint system being protected from the open computer network by a firewall, the method comprising:
providing a scanner engine in a computer server in communication with the open computer network;
providing a scanner agent installed on the endpoint system in communication with the open computer network through the firewall;
establishing a secure layer connection between the scanner engine and the scanner agent without requiring credentialed access through an open firewall port;
sending, from the scanner engine to the scanner agent installed on the endpoint system, commands for collecting data from the endpoint system;
collecting data based on the commands via the secure layer connection regarding the endpoint system using the scanner agent, the collected data including at least one of system configuration information, system services information, or file system information;
receiving the collected data from the scanner agent at the scanner engine via the secure layer connection;
analyzing the collected data with the scanner engine to assess a current security vulnerability posture of the endpoint system, and determining any updates for the endpoint system from the analysis; and
sending the updates via the secure layer connection to the scanner agent for installation on the endpoint system.

2. A method according to claim 1, wherein the endpoint system includes a web browser, and wherein the scanner agent is installed as a plug-in for the web browser.

3. A method according to claim 2, wherein the web browser further comprises a graphical user interface for use by a user of the endpoint system in initiating and conducting the scan.

4. A method according to claim 1, wherein the secure layer connection between the scanner agent and the scanner engine comprises a secure layer connection between the scanner agent and a proxy server associated with the scanner engine.

5. A method according to claim 1, wherein the secure layer connection comprises a secure HTTP-based connectivity.

6. A method according to claim 1, wherein the secure layer connection comprises encrypting data communication between the scanner agent and the scanner engine.

7. A method according to claim 1, wherein the updates comprise virus definition updates.

8. A system for conducting a scan on an endpoint system across an open computer network, the endpoint system being protected from the open computer network by a firewall, the system comprising:
a computer server in communication with the open computer network, wherein the computer server comprises a scanner engine;

a scanner agent installed on the endpoint system in communication with the open computer network through the firewall; and a secure layer connection established between the scanner engine and the scanner agent without requiring credentialed access through an open firewall port;

wherein the scanner engine is configurable to send commands for collecting data from the endpoint system to the scanner agent installed on the endpoint system;

wherein the scanner agent is configurable to collect data regarding the endpoint system based on the commands, the collected data including at least one of system configuration information, system services information, or file system information;

wherein the scanner engine is configurable to:
  receive data via the secure layer connection regarding the endpoint system collected by the scanner agent;
  analyze the collected data to assess a current security vulnerability posture of the endpoint system and determine any updates for the endpoint system from the analysis, and
  send the updates via the secure layer connection to the scanner agent for installation on the endpoint system.

9. A system according to claim 8, wherein the endpoint system includes a web browser, and wherein the scanner agent is installed as a plug-in for the web browser.

10. A system according to claim 9, wherein the web browser further comprises a graphical user interface for use by a user of the endpoint system in initiating and conducting the scan.

11. A system according to claim 8, wherein the secure layer connection is established between the scanner agent and a proxy server associated with the scanner engine.

12. A system according to claim 11, wherein the proxy server initiates the scanner engine once the secure layer connection is established.

13. A system according to claim 8, wherein the secure layer connection comprises a secure HTTP-based connectivity.

14. A system according to claim 8, wherein the secure layer connection encrypts data communication between the scanner agent and the scanner engine.

15. A system according to claim 8, wherein the updates comprise virus definition updates.

16. A method of conducting a scan on an endpoint system across an open computer network, the endpoint system being protected from the open computer network by a firewall, the method comprising:
  providing a scanner engine in a computer server in communication with the open computer network;
  establishing a secure layer connection across the open computer network between the scanner engine and a scanner agent without requiring credentialed access through an open firewall port, the scanner agent installed on the endpoint system in communication with the open computer network through the firewall;
  sending commands for collecting data regarding the endpoint system from the scanner engine via the secure layer connection to the scanner agent installed on the endpoint system, the collected data including at least one of system configuration information, system services information, or file system information;
  receiving the collected data from the scanner agent via the secure layer connection to the scanner engine;
  analyzing the collected data with the scanner engine to assess a current security vulnerability posture of the endpoint system, and determining any updates for the endpoint system from the analysis;
  sending the updates across the secure layer connection to the scanner agent for installation on the endpoint system; and
  terminating the secure layer connection after the updates are received by the endpoint system.

17. A method according to claim 16, wherein the endpoint system includes a web browser, and wherein the scanner agent is installed as a plug-in for the web browser.

18. A method according to claim 17, wherein the web browser further comprises a graphical user interface for use by a user of the endpoint system in initiating and conducting the scan.

19. A method according to claim 16, wherein establishing a secure layer connection between the scanner agent and the scanner engine comprises establishing the secure layer connection between the scanner agent and a proxy server associated with the scanner engine.

20. A method according to claim 19, wherein the proxy server initiates the scanner engine once the secure layer connection is established.

21. A method according to claim 16, wherein the secure layer connection comprises a secure HTTP-based connectivity.

22. A method according to claim 16, wherein the secure layer connection comprises encrypting data communication between the scanner agent and the scanner engine.

23. A method according to claim 16, wherein the updates comprise virus definition updates.

24. A system for conducting a scan on an endpoint system across an open computer network, the endpoint system being protected from the open computer network by a firewall, the system comprising:
  a computer server in communication with the open computer network, wherein the computer server comprises a scanner engine;
  a scanner agent installed on the endpoint system in communication with the open computer network through the firewall;
  a secure layer connection established between the scanner engine and the scanner agent without requiring credentialed access through an open firewall port; and
  wherein the scanner agent is configurable to collect data regarding the endpoint system, the collected data including at least one of system configuration information, system services information, or file system information;
  wherein the scanner engine is configurable to:
    send commands via the secure layer connection for collecting data regarding the endpoint system to the scanner agent installed on the endpoint system,
    receive the collected data from the scanner agent via the secure connection,
    analyze the collected data to assess a current security vulnerability posture of the endpoint system and determining any update for the endpoint system from the analysis, and
    send the updates via the secure connection to the scanner agent for installation on the endpoint system.

25. A system according to claim 24, wherein the endpoint system includes a web browser, and wherein the scanner agent is installed as a plug-in for the web browser.

26. A system according to claim 25, wherein the web browser further comprises a graphical user interface for use by a user of the endpoint system in initiating and conducting the scan.

27. A system according to claim 24, wherein the secure layer connection is established between the scanner agent and a proxy server associated with the scanner engine.

28. A system according to claim 27, wherein the proxy server initiates the scanner engine once the secure layer connection is established.

29. A system according to claim 24, wherein the secure layer connection comprises a secure HTTP-based connectivity.

30. A system according to claim 24, wherein the secure layer connection encrypts data communication between the scanner agent and the scanner engine.

31. A system according to claim 24, wherein the updates comprise virus definition updates.

32. A method of conducting a scan on an endpoint system across an open computer network, the endpoint system being protected from the open computer network by a firewall, the method comprising:

providing a scanner engine in a computer server in communication with the open computer network;

providing a scanner agent installed on the endpoint system in communication with the scanner engine through the open computer network a secure layer connection established between the scanner engine and the scanner agent without requiring credentialed access through an open firewall port;

receiving, at the scanner agent installed on the endpoint system and via the secure layer connection, commands from the scanner engine to access an operating system of the endpoint system to collect data regarding the endpoint system;

collecting, by the scanner agent and via the secure layer connection, data regarding the endpoint system, the collected data including at least one of system configuration information, system services information, or file system information;

receiving, at the scanner engine and via the secure layer connection, the collected data from the scanner agent;

analyzing, at the scanner engine, the collected data to assess a current security vulnerability posture of the endpoint system, and determining any updates for the endpoint system from the analysis; and sending the updates via the secure layer connection to the scanner agent for installation on the endpoint system.

* * * * *